United States Patent Office 3,505,401
Patented Apr. 7, 1970

3,505,401
N-CYANOSULFILIMINES AND THEIR PREPARATION FROM CYANOGEN AZIDE AND ORGANIC SULFIDES
Frank Dennis Marsh, Wilmington, Del., assignor to E. I. du Pont de Nemours and Company, Wilmington, Del., a corporation of Delaware
No Drawing. Filed Nov. 2, 1967, Ser. No. 679,986
Int. Cl. C07c *145/00*
U.S. Cl. 260—551                    8 Claims

ABSTRACT OF THE DISCLOSURE

Described and claimed are (1) N-cyanosulfilimines of the formula

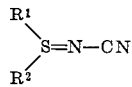

wherein $R^1$ and $R^2$, which may be the same or different, represent alkyl, cycloalkyl, aryl, alkaryl or aralkyl groups either unsubstituted or bearing as substituents one or more groups that are unreactive with cyanogen azide and (2) the process of preparing said N-cyanosulfilimines by reacting the corresponding organic sulfides with cyanogen azide. The compounds of this invention are useful as selective herbicides.

BACKGROUND OF THE INVENTION

Field of the invention

This invention relates to N-cyanosulfilimines and to their preparation by the reaction of cyanogen azide with organic sulfides.

Description of the prior art

No references are known which disclose N-cyanosulfilimines or the reaction of azides with organic sulfides to form sulfilimines. Compounds containing the N=S group are known, but none of these contains a nitrile group. Of the compounds containing the N=S function, the following are of possible interest in connection with the present invention:

(a) The sulfonyl sulfilimines, $R_2S=N-SO_2R$, as described by Epshtein et al. in Zh. Obsch. Khim. 34 (7), 2350 (1964); C.A. 61, 9395 (1965); and Shulz et al. in Angew. Chem. 75 (21), 1022 (1963); C.A. 60, 1631 (1964).

(b) The organoiminosulfur difluorides, $F_2S=NR$, as described by Smith et al. in J. Am. Chem. Soc. 82, 551 (1960).

(c) The sulfur diimines, $RN=S=NR$, as described by Clemens et al. in Tetrahedron Letters, No. 20, 1487 (1965).

(d) The S,S-dialkyl-N-sulfosulfilimines, $$R_2S=N-SO_2-N=SR_2$$

as described by Appel et al. in Ber. 97 (3), 852 (1964); C.A. 60, 11888 (1964).

SUMMARY AND DETAILS OF THE INVENTION

The N-cyanosulfilimines of this invention are represented by the formula

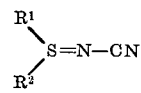

wherein $R^1$ and $R^2$ represent the same or different alkyl, cycloalkyl, aryl, alkaryl or aralkyl groups which are either unsubstituted or bear one or more substituents not reactive with cyanogen azide. Any of the halogens, cyano and nitro are examples of such substituents. Chlorine is a preferred substituent for $R^1$ and/or $R^2$.

Preferred for $R^1$ and $R^2$ are alkyl groups containing 1–18 carbon atoms, cycloalkyl groups containing 4–6 carbon atoms and aryl groups containing 6–14 carbon atoms. $R^1$ and $R^2$ may be conjoined in appropriate instances in which case the above formula will be understood to represent N-cyanosulfilimines derived from cyclic sulfides. Examples of such cyclic sulfides are thietane (trimethylene sulfide), tetramethylene sulfide and tetramethylethylene sulfide.

The N-cyanosulfilimines are thermally stable liquid or solid materials which are usually colorless. The lower alkyl derivatives are water soluble and can be recovered from aqueous solutions.

The N-cyanosulfilimines of this invention are prepared by the reaction of cyanogen azide with an organic sulfide of the formula $R^1SR^2$, wherein $R^1$ and $R^2$ are as previously designated. The sulfide, either neat or dissolved in an appropriate solvent, is usually added gradually to a solution of cyanogen azide with stirring to avoid excessive temperature through localized heat build-up, although the azide may be added to the sulfide. The reaction is mildly exothermic and spontaneous for lower alkyl sulfides whereas for higher alkyl- and arylsulfides heat may be required. It is convenient to use at least one mole of sulfide per mole of cyanogen azide to obtain a maximum product yield and to avoid the presence of unreacted cyanogen azide.

The reaction of cyanogen azide with the organic sulfide can be effected with or without solvent in addition to that normally present in the cyanogen azide reagent. Solvents which are less reactive toward cyanogen azide than the sulfide reactant can be used. These solvents include saturated aliphatic or aromatic hydrocarbons, halohydrocarbons, ketones, esters and nitriles. An excess of the sulfide reactant can serve as a solvent component in the final reaction mixture.

The reaction can be effected in a batch or flow system usually at ordinary pressure. But pressures above and below atmospheric may be employed if desired.

The time of reaction, as a rule, depends upon the reaction temperature which may be a temperature in the range 0–150° C. and is preferably one in the range of about 20–60° C. Lower temperatures and longer times are generally used in batch operations, while higher temperatures and shorter times are appropriate in continuous flow operations. Batch process times are usually in the range of 0.5 to 24 hours, and flow process contact times can be in the range of 0.1 second to several minutes.

WARNING

Cyanogen azide, a chemical employed in the immediate invention, is explosive when free or nearly free of solvent and should then be handled with great care. It can be used with comparative safety, however, in dilute to moderately concentrated solutions.

DESCRIPTION OF THE SPECIFIC EMBODIMENTS

There follow some nonlimiting examples illustrative of the invention.

EXAMPLE I

N-cyano-S,S-dimethylsulfilimine $$(CH_3)_2S + N_3CN \xrightarrow{-N_2} (CH_3)_2S=N-CN$$

An excess of dimethylsulfide (48 g., 0.78 mole) was added during 2 hours to a solution of cyanogen azide (0.42 mole) in toluene (100 ml.). Nitrogen was liberated (~0.41 mole), and the mildly exothermic reaction was controlled at 16–31° C. When addition was complete, the mixture was stirred at room temperature for an additional 18 hours, and then filtered to separate a light tan crystalline solid (41.85 g., 98%). An aliquot (41.2 g.) of this product was dissolved in methylene chloride (250 ml.), warmed with a little carbon black, and filtered. The filtrate was diluted with petroleum ether and refiltered to isolate white crystals (37.2 g., M.P. 81.82.1° C.).

An analytical sample was recrystallized once from ethyl acetate (M.P. 81.7–83° C.) and once again from tetrahydrofuran to give white needles, M.P. 81.8–83° C.

*Analysis.*—Calcd. for $C_3H_6N_2S$ (percent): C, 35.27; H, 5.92; N, 27.42; S, 31.39; M.W., 102. Found (percent): C, 35.70, 35.71; H, 6.63, 6.43; N, 27.28, 27.33; S, 31.18, 31.20; M.W., 100 (cryoscopic in dimethyl sulfoxide). H N.M.R. spectrum: ($D_2O$ solution, tetramethylsilane internal standard) τ 7.03 (single peak).

*Infrared Specturm:* $\lambda_{max}^{KBr}$ 3.0, 6.5μ (weak absorptions—possible NH-impurity); 3.33, 3.44μ (saturated C-H); 4.68μ (CN); 7.60μ.

EXAMPLE II

N-cyano-S,S-diethylsulfilimine $$(C_2H_5)_2S + N_3CN \xrightarrow{-N_2} (C_2H_5)_2S=N-CN$$

To a solution of cyanogen azide (12.9 g., 0.19 mole) in toluene (133 ml. total solution volume) was added diethyl sulfide (18.0 g., 0.2 mole) over a period of 1.5 hours. The initial exothermic reaction was controlled at 25–35° C., while nitrogen (~0.18 mole) was liberated. After addition was complete, the mixture was stirred at room temperature for 17 hours, then passed through a 2-inch bed of Florisil® and eluted with acetonitrile. The eluant was evaporated to dryness under reduced pressure to give a light brown mobile oil (23.31 g., 94.5%). An aliquot (5.3 g.) of this oil was distilled in a short path still (pot temperature 148–166° C./0.1μ) to give a pale yellow oil (3.5 g., $n_D^{24}$ 1.5230–1.5235), which analyzed correctly for N-cyano-S,S-diethylsulfilimine.

*Analysis.*—Calcd. for $C_5H_{10}N_2S$ (percent): C, 46.10; H, 7.74; N, 21.52; S, 24.63; M.W., 130.2. Found (percent): C, 46.45; H, 7.63; N, 21.31; S, 24.64; M.W., 130 (mass spec.). H N.M.R. spectrum: (Neat sample, tetramethylsilane internal standard).

| $\bar{\nu}$ | Assignment | Intensity |
|---|---|---|
| 8.67 (triplet) | $CH_3-C$ | 3 |
| 6.63–7.23 (complex group) | $-CH_2-S-CH_2-$ | 2 |

*Infrared Specturm:* $\lambda_{max}^{neat}$ 3.30, 3.42, 3.48μ (saturated C-H), 4.47 (w.), 4.66 (v.s.), 4.78μ (w.), (NCN), 3.05 3.13μ (w., possibly impurities).

EXAMPLE III

N-cyano-S,S-n-dodecylsulfilimine $$[CH_3-(CH_2)_{11}]_2S + N_3CN \longrightarrow [CH_3-(CH_2)_{11}]_2S=NCN$$

N-dodecyl sulfide (18.5 g., 0.05 mole) dissolved in ethyl acetate (100 ml.) was added to an ethyl acetate solution of cyanogen azide (4.1 g., 0.06 mole, 13.5 cc.) and the mixture stirred and heated at 46–50° C. for 20 hours. The mixture was treated with carbon black and filtered; and the filtrate was evaporated to dryness (35° C./0.25 mm.) to give light tan crystals (20.72 g., 101%). This product was recrystallized from petroleum ether to give white crystals (20.4 g., 99%), having an infrared spectrum identical with the more highly purified product described below. An aliquot (5.2 g.) of another sample of product prepared in the same manner was adsorbed on Florisil® (magnesia silica gel, 130 g., 60–100 mesh, 65×2 cm. column) and eluted (100 ml. fractions) with normal hexane (fractions A1–A5, nil), 90/10 normal hexane/benzene (fractions A6–A13, 0.1832 g.), 50/50 normal hexane/benzene (fractions A14 and B1–B4, nil), 80/20 normal hexane/methyl chloride (fractions B5–B7, nil), methylene chloride (fractions B8–B10, nil), 95/5 methylene chloride/tetrahydrofuran (fractions B11–B13, nil), and 70/30 methylene chloride/tetrahydrofuran (fractions B14 and C1–C4, 4.7142 g.).

The eluants in fractions A6–A13 were each identified as N-dodecyl sulfide by comparison of melting points and infrared spectra. The infrared spectra of eluants from fractions B14 and C1–C4 were identical. Product from fraction B14 was recrystallized from petroleum ether to give fine white needles, M.P. 49.5–63° C.

*Analysis.*—Calcd. for $C_{25}H_{50}N_2S$ (percent): C, 73.10; H, 12.27; N, 6.82; S, 7.80; M.W., 410.8. Found (percent): C, 73.39, 72.91, 73.14; H, 12.33, 12.21, 12.29; N, 6.73, 6.96; M.W., 389 (cryoscopic in dimethyl sulfoxide). Infrared spectrum: 3.37, 3.42, 3.50μ (C—H); 4.70μ (CN); 7.26μ (C—$CH_3$). H N.M.R. spectrum: (carbon tetrachloride solution, tetramethylsilane as internal standard).

| $\bar{\nu}$ | Assignment | Intensity |
|---|---|---|
| 7.0 (broad peak) | $-CH_2-S-CH_2-$ <br> $\parallel$ <br> $N-CN$ | 2 |
| 8.72 (single peak) | $-CH_2-$ | 10 |
| 9.12 (complex group) | $-CH_3-$ | 3 |

EXAMPLE IV

N-cyano-S-methyl-S-(p-chlorophenyl)sulfilimine

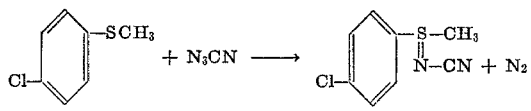

Methyl p-chlorophenyl sulfide (31.63 g., 0.2 mole) dissolved in acetonitrile (75 ml.) was added to cyanogen azide (0.2 mole) in acetonitrile (total volume 69 cc.) and the mixture stirred and heated at 48–53° C. for 17 hours, during which time nitrogen (~0.2 mole) was liberated. The reaction mixture was filtered and the filtrate evaporated to dryness on a rotary evaporator (40° C./1 mm.) to give a brown crystalline solid (35.81 g., 90%).

An aliquot of the product (5.31 g.) was adsorbed on Florisil® (magnesia silica gel, 60–100 mesh, 130 g., 65×2 cm. column) and eluted (100 ml. fractions) with normal hexane (fractions 1–4, 1.430 g.), 90/10 normal hexane/methylene chloride (fractions 5–8, nil), methylene chloride (fractions 9–10, nil), 90/10 methylene chloride/tetrahydrofuran (fractions 10–16 and 1A–11A, 2.543 g.), and 50/50 methylene chloride/tetrahydrofuran (fractions 12A–26A, 1.292 g.).

Eluants in fractions 1–4 were identified as methyl p-chlorophenyl sulfide by their infrared spectra. Products from fractions 10–16 and 1A–26A, shown to be essentially identical by melting point and infrared spectra, were combined. An aliquot of the combined fraction was sublimed (130–160° C./0.1μ), and the sublimate was recrystallized from chloroform and petroleum ether to give pure N-cyano-S-methyl-S-(p-chlorophenyl) sulfilimine, M.P. 107–108° C.

*Analysis.*—Calcd. for $C_8H_7N_2SCl$ (percent): C, 48.26; H, 3.55; N, 14.10; S, 16.14; Cl, 17.84; M.W., 198.7. Found (percent): C, 48.74, 48.73; H, 3.72, 3.71; N, 14.17, 14.27, 14.10; S, 15.93, 15.97. M.W. 196 (cryoscopic in dimethyl sulfoxide). H N.M.R. spectrum: ($CDCl_3$ solution, tetramethylsilane as internal standard).

| $\nu$ | Assignment | Intensity |
|---|---|---|
| 6.96 (single peak) | —$CH_3$ | 3 |
| 2.27 (w.s.s.w.) | 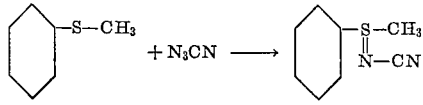 | 4 |

Infrared spectrum: $3.25\mu$ (=CH), 3.34, 3.45 (sat. C—H), $4.70\mu$ (CN), 6.38, 6.77 (aromatic C=C), $7.67\mu$, $12.15\mu$ (para-disubstituted aromatic).

EXAMPLE V

N-cyano-S-cyclohexyl-S-methylsulfilimine

Cyclohexyl methyl sulfide (28.6 g., 0.22 mole) was added to a solution of cyanogen azide in acetonitrile (0.22 mole, 98 ml.). The mixture was stirred for 17 hours with cooling to maintain a temperature of 25–28° C. Nitrogen (approximately 0.20 mole) was liberated. The clear light-yellow reaction mixture was evaporated to dryness (25° C./0.5 mm.) to give a viscous tan oil (35.63 g., 95%). An aliquot (5.30 g.) of this material was absorbed on Florisil® (130 g., 65×2 cm. column) and eluted (100 ml. fractions) with n-hexane (fractions 1–3, nil), benzene (fractions 4–7, 0.044 g.), methylene chloride (fractions 8–14, nil), 90/10 methylene chloride/tetrahydrofuran (fractions 3A–9A, 1.456 g.), 80/20 methylene chloride/tetrahydrofuran (fractions 10A–13A, 0.778 g.), and tetrahydrofuran (fractions 14A–16A and 3B, 1.016 g.).

Products from fractions 4–7 were identified as unreacted cyclohexyl methyl sulfide by their infrared spectra. Eluants from the remaining fractions were essentially identical as shown by their infrared spectra. Products from fractions 3A–9A were combined and recrystallized twice from benzene and petroleum ether to give pure N-cyano-S-cyclohexyl-S-methylsulfilimine (M.P. 78.5–79.5° C.).

*Analysis.*—Calcd. for $C_4H_{14}N_2S$ (percent): C, 56.43; H, 8.29; N, 16.43; S, 18.83; M.W., 170.3. Found (percent): C, 56.10, 56.37; H, 8.22, 8.13; N, 16.43, 16.81; M.W., 164 (cryoscopic in dimethyl sulfoxide). H'N.M.R. spectrum: ($CDCl_3$ solution, tetramethylsilane as internal standard).

| $\nu$ | Assignment | Intensity |
|---|---|---|
| 7.23 (single peak) | —$CH_3$ | 2 |
| 6.68–7.43 (broad peak) | >C—S | |
| 8.3 (broad complex) | —$CH_2$ | 5 |

Infrared spectrum: 3.32, 3.42, $3.50\mu$ (C—H); $4.65\mu$ (CN); $7.52\mu$ (S—$CH_3$).

Additional representative operable sulfides together with the products derived from their reaction with cyanogen azide using the procedure of Example I are set forth in the following table.

TABLE—SULFIDES AND PRODUCT NAMES

| Sulfide | Product |
|---|---|
| Alkyl of 1–18 carbons: | |
| Methyl ethyl sulfide | N-cyano-S-methyl-S-ethylsulfilimine. |
| n-Butyl isobutyl sulfide | N-cyano-S-n-butly-S-isobutylsulfilimine. |
| n-Butyl n-decyl sulfide | N-cyano-S-n-butyl-S-n-decylsulfilimine, |
| Dioctyl sulfide | N-cyano-S,S-dioctylsulfilimine. |
| Dioctadecyl sulfide | N-cyano-S,S-dioctadecylsulfilimine. |
| n-Amyl 2-chloroethyl sulfide | N-cyano-S-n-amyl-S-2-chloroethylsulfilimine. |
| Ethyl 2-bromoethyl sulfide | N-cyano-S-ethyl-S-2-bromoethylsulfilimi e. |
| Bis(2-cyanoethyl) sulfide | N-cyano-S-bis(2-cyanoethyl)-sulfilimine. |
| Methyl 2-nitroethyl sulfide | N-cyano-S-methyl-S-2-nitroethylsulfilimine. |
| Trimethylene sulfide | N-cyano trimethylenesulfilimine. |
| Tetramethylethylene sulfide | N-cyano tetramethylethylenesulfilimine. |
| Cycloalkyl of 4–6 carbons: | |
| Methyl cyclopentyl sulfide | N-cyano-S-methyl-S-cyclopentyl, sulfilimine. |
| Dicyclohexyl sulfide | N-cyano-S,S-dicyclohexylsulfilimine. |
| Aryl of 6–14 carbons: | |
| Phenyl sulfide | N-cyano-S,S-diphenylsulfilimine. |
| p-Tolyl sulfide | N-cyano-S,S-di-p-tolylsulfilimine. |
| p-Cyanobenzyl methyl sulfide | N-cyano-S-p-cyanobenzyl-S-methylsulfilimine. |
| Benzyl 2-chloroethyl sulfide | N-cyano-S-benzyl-S-2-chloroethylsulfilimine. |
| p-Methylmercaptobenzonitrile | N-cyano-S-methyl-S-p-cyanophenylsulfilimine. |
| Phenyl 4-nitrophenyl sulfide | N-cyano-S-phenyl-S-4-nitrophenylsulfilimine. |
| Multiple substituents: | |
| Trifluoromethyl ethyl sulfide | N-cyano-S-trifluoromethyl-S-ethylsulfilimine. |
| Bis(-nitrobutyl) sulfide | N-cyano-S-bis(2-nitrobutyl)sulfilimine. |
| m-Trifluoromethylphenyl phenyl sulfide. | N-cynao-S-nitrofluoromethylphenyl-S-phenylsulfilimine. |
| p-Iodophenyl phenyl sulfide | N-cyano-S-p-iodophenyl-S-pheylsulfilimine. |

All of the N-cyano-sulfilimines of this invention are useful as selective herbicides. They are especially effective for use in controlling mustard plants as shown in Example A.

EXAMPLE A (1) When applied at a distribution of 16 lbs./acre, N-cyano-S,S-diethyl-sulfilimine (the compound of Example II) and N-cyano-S-methyl-S-(p-chlorophenyl)sulfilimine (the compound of Example IV) killed all mustard plants present.

(2) When applied at a distribution of 16 lbs./acre, N-cyano-S-cyclohexyl-S-methyl sulfilimine (the compound of Example V) severely damaged the mustard plants present.

Since obvious modifications and equivalents will be evident to those skilled inthe chemical arts, I propose to be bound solely by the appended claims.

I claim:
1. An N-cyanosulfilimine of the formula

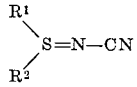

wherein $R^1$ and $R^2$ represent organic functions which are individually alkyl of up to 18 carbon atoms, cycloalkyl or monochlorocycloalkyl of 5–6 carbon atoms, phenyl, tolyl, benzyl, trifluoromethylphenyl, halosubstituted alkyl of up to 18 carbon atoms bearing as substituents up to 3 atoms of a halogen selected from the group consisting of fluorine, chlorine, bromine and iodine, monocyanoalkyl, mononitroalkyl, or monohalo-, mononitro- and monocyanophenyl or $R^1$ and $R^2$ represent organic functions which are jointly the divalent radicals trimethylene, tetramethylene or tetramethylethylene.

2. The compound of claim 1 wherein $R^1 = R^2 =$ methyl, N-cyano-S,S-dimethylsulfilimine.

3. The compound of claim 1 wherein $R^1 = R^2 =$ ethyl, N-cyano-S,S-diethylsulfililimine.

4. The compound of claim 1 wherein $R^1=R^2=$dodecyl, N-cyano-S,S-dodecylsulfilimine.

5. The compound of claim 1 wherein $R^1=$methyl and $R^2=$p-chlorophenyl, N-cyano-S-methyl-S-(p-chlorophenyl)sulfilimine.

6. The compound of claim 1 wherein $R^1=$methyl and $R^2=$cyclohexyl, N-cyano - S - cyclohexyl-S-methylsulfilimine.

7. The process of preparing an N-cyanosulfilimine of claim 1 which comprises reacting, at a temperature in the range 0–150° C., an organic sulfide of the formula

wherein $R^1$ and $R^2$ have the significance stated in claim 1, with cyanogen azide.

8. The process of claim 7 wherein the reactioin temperature is in the range 20–60° C.

References Cited

UNITED STATES PATENTS 3,268,512   8/1966   Marsh _____ 260—551

HENRY R. JILES, Primary Examiner

H. I. MOATZ, Assistant Examiner

U.S. Cl. X.R.

260—327, 329, 465.5, 465; 71—90, 98

PO-1050
(5/69)

UNITED STATES PATENT OFFICE
CERTIFICATE OF CORRECTION

Patent No. 3,505,401  Dated March 7, 1970

Inventor(s) Frank Dennis Marsh

It is certified that error appears in the above-identified patent and that said Letters Patent are hereby corrected as shown below:

Col. 3, l. 64, the first heading of the table should be -- $\tau$ --; line 72, the title after "Example III" should be -- N-cyano-S,S-di-n-dodecylsulfilimine --; l. 74, the first word of the paragraph should be -- Di-n-dodecyl --;

Col. 4, l. 22, "N-dodecyl" should be -- di-n-dodecyl --; l. 35, the first heading of the table should be -- $\tau$ --;

Col. 5, l. 11, the first heading of the table should be -- $\tau$ --; and

Col. 7, Claim 4, lines 1-2; " =dodecyl," should be -- =n-dodecyl, --; and l. 2, "N-cyano-S,S-dodecylsulfilimine" should be -- N-cyano-S,S-di-n-dodecylsulfilimine --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents